US006134613A

United States Patent [19]

Stephenson et al.

[11] Patent Number: 6,134,613

[45] **Date of Patent: *Oct. 17, 2000**

[54] COMBINED VIDEO PROCESSING AND PERIPHERAL INTERFACE CARD FOR CONNECTION TO A COMPUTER BUS

[75] Inventors: Jeffery B. Stephenson, Kaysville; Grant W. Dearden, Henefer; David L. Jolley, Kaysville; Thierry Doyen, Layton; Erich M. Flynn, Ogden, all of Utah; Edward M. Domengeaux, Los Gatos, Calif.

[73] Assignee: Iomega Corporation, Roy, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,560

[22] Filed: Jun. 16, 1997

[51] Int. Cl.[7] .......... G06F 13/00

[52] U.S. Cl. .......... 710/102; 710/1; 710/2; 710/68; 710/101; 710/126; 710/128; 364/239.9

[58] Field of Search .......... 364/239.9; 710/68, 710/101, 126, 128, 2, 102, 1

[56] References Cited

U.S. PATENT DOCUMENTS

| | | | |
|---|---|---|---|
| 5,276,311 | 1/1994 | Hennige | 235/380 |
| 5,664,218 | 9/1997 | Kim et al. | 395/821 |
| 5,748,913 | 5/1998 | Shibahara | 395/282 |
| 5,909,559 | 6/1999 | So | 710/127 |

FOREIGN PATENT DOCUMENTS

| | | |
|---|---|---|
| 0 661 637 A1 | 7/1995 | European Pat. Off. . |

OTHER PUBLICATIONS

"New Chips Give Pcs TV–Quality Video", *EDN Electrical Design News*, 1994, 39(7), 38–43.

Zander, H., "Desktop Video (2)" ("Multimediale Anwandungen im Videobereich"), *Fernseh Und Kinotechnik*, 1994, 48(7/8), 376–384.

*Primary Examiner*—Ayaz R. Sheikh
*Assistant Examiner*—Frantz Blanchard Jean
*Attorney, Agent, or Firm*—Woodcock Washburn Kurtz Mackiewicz & Norris LLP

[57] ABSTRACT

A bus card for connecting to a local bus of a computer system comprises a connector for connecting to the local bus, a peripheral interface controller for enabling communication between a peripheral device and the local bus, video processing circuitry having connectors to enable input and output of video signals, and a bridge circuit that enables the peripheral interface controller and the video processing circuitry to share the connection to the local bus of the computer system.

6 Claims, 1 Drawing Sheet

10
12
Video Connectors
Video Decoder 14
Compression/ Decompression 18
17
Video Encoder 16
PCI Multimedia Controller 20
15
22
PCI to SCSI Controller 24
PCI Bridge Chip 26
SCSI Bus Connector
21
PCI Bus Connector 28

COMBINED VIDEO PROCESSING AND PERIPHERAL INTERFACE CARD FOR CONNECTION TO A COMPUTER BUS

BACKGROUND

1. Field of the Invention

The present invention relates to computer systems, and more particularly, to a bus card for personal computers and workstations that combines the functionality of both video processing and peripheral interface control.

2. Description of the Prior Art

Personal computers have evolved from simple business productivity tools (e.g., word processing, spreadsheets, etc.) to more sophisticated communication and entertainment platforms for both home and corporate use. Home computer users and professionals have enjoyed multimedia computer entertainment for quite some time. With the rapid decrease in the price of digital cameras, many business and home computer users are using their computers for digital photography. And, because many personal computers can be used to play audio compact discs (CDS), home and professional users are also using their personal computers for audio entertainment. A logical next step is for home users and professionals to begin widespread use of personal computers for video capture and editing.

Unfortunately, however, there presently are major obstacles to achieving wide spread use of personal computers for such advanced entertainment applications as video editing. Today, it is much too complex and difficult for typical personal computer users to purchase and install the necessary equipment to enable use of a personal computer for video processing applications. Use of a personal computer for video processing presently requires the selection and integration of a variety of expensive hardware and software components from multiple vendors. Consequently, there is a need for a complete and economical personal computer entertainment solution that includes everything needed to perform video processing functions, such as video editing. The present invention satisfies this need.

SUMMARY OF THE INVENTION

The present invention combines video processing and peripheral interface control functions in a single bus card for personal computers and workstations. In accordance with a preferred embodiment, the bus card of the present invention is designed to connect to a Peripheral Component Interconnect (PCI) bus of a personal computer. The bus card comprises a PCI-to-SCSI interface controller for providing an interface to SCSI peripherals, such as SCSI storage devices. The bus card further comprises video processing circuitry, which comprises connectors for video input and output, a video encoder, a video decoder, and a multimedia controller that provides an interface between the PCI bus and the video processing circuitry. A PCI-to-PCI bridge circuit allows the PCI-to-SCSI controller and multimedia controller to share a connection to the PCI bus of the personal computer. By combining video processing capabilities and a SCSI interface in a single PCI bus card, the present invention provides an efficient, economic, single-card solution for personal computers that will enable easy input, output, processing, capture and storage of digital video information. With the present invention, video data can be received from video devices, decoded, compressed, and stored to disk using only one bus card. Similarly, the bus card of the present invention can be used to retrieve video data from a storage disk, decompress it, encode it, and transmit it back to various video devices. Previously, this functionality required the use, installation, and integration of a number of separate bus cards typically supplied by different vendors.

These and other features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
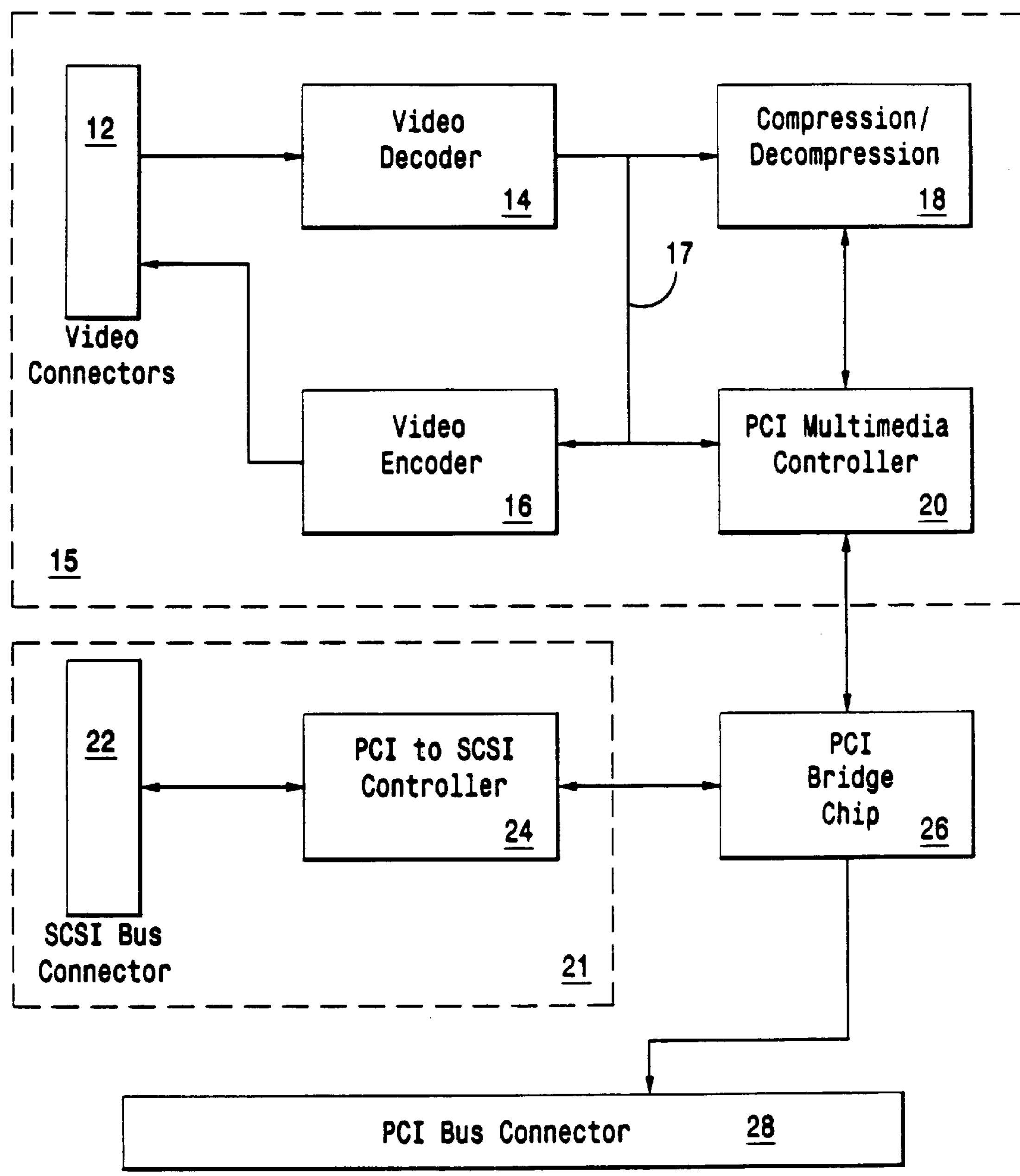
FIG. 1 is a block diagram of a bus card according to a preferred embodiment of the present invention.

Referring to the drawings wherein like numerals indicate like elements throughout, there is shown in FIG. 1 a block diagram of a bus card 10 (sometimes also referred to as an adapter card) in accordance with a preferred embodiment of the present invention. According to the present invention, the bus card 10 combines both video processing functions and peripheral interface control functions in a single card. In the preferred embodiment, the bus card 10 is designed for connection to a PCI bus of a personal computer or workstation. To this end, the bus card 10 includes a PCI bus connector 28 which can be connected to a PCI bus slot on the personal computer (not shown).

The bus card 10 of the present invention further comprises video processing circuitry 15 that provides various video processing functions. The term "video processing circuitry," as used herein and in the claims, means any circuitry that is capable of performing video processing functions, such as, for example, video and image capture, video and image editing, encoding and decoding of video images, video and image compression/decompression, playback of full-motion video, etc. In the present embodiment, the video processing circuitry 15 comprises a video decoder 14, a video encoder 16, a video compression/decompression circuit 18, and a multimedia controller 20. A series of video connectors 12 allow external video devices, such as camcorders, cameras, displays and the like, to be connected to the video processing circuitry. In the present embodiment, the video connectors include RCA In/Out for composite video and S-video In/Out.

The video decoder 14 receives analog video signals and converts the analog video signals to digital video signals. The digital video signals can then be transmitted via an internal bus 17 to the video encoder 16, the compression/decompression circuit 18, or the multimedia controller 20. In the present embodiment, the video decoder 14 is implemented using an Enhanced Video Input Processor (EVIP) chip available from Philips Semiconductors, part no. SAA7111A. The EVIP accepts, as analog inputs, CVBS or S-video (Y/C) from analog sources, such as a television or a VTR unit. The EVIP can output video data streams in either 16, 12, or 8-bit widths, with the following formats: YUV 4:1:1 (12-bit); YUV 4:2:2 (16-bit); YUV 4:2:2 (CCIR-656)(8-bit); RGB (5,6,5) (16-bit); or RGB (8,8,8) (24-bit). The EVIP is a combination of a two-channel analog preprocessing circuit including source selection, anti-aliasing filter and ADC, an automatic clamp and gain control, a clock generation circuit, a digital multi-standard decoder (PAL BGHI, PAL M, PAL N, NTSC M, NTSC-Japan, NTSC N and SECAM), a brightness/contrast/saturation control circuit, a color space matrix, and a 27 MHZ VBI-data bypass.

The video encoder 16 receives digital video data from the video decoder 14, multimedia controller 20, or compression/decompression circuit 18 and converts the digital video data into an analog video signal. In the present embodiment, the video encoder 16 is implemented by a Digital Video Encoder (DENC2) chip available from Philips Semiconductors, part no. SAA7185. The DENC2 chip accepts CCIR compatible YUV data with 720 active pixels per line in 4:2:2 multiplexed format, and encodes the data to either an NTSC, PAL CVBS, or S-video signal.

The compression/decompression circuit 18 provide compression and decompression of digital video data. In the present embodiment, the compression/decompression circuit 18 is implemented by an Integrated JPEG CODEC chip available from ZORAN Corporation, 1705 Wyatt Drive, Santa Clara, Calif. 95054, part no. ZR36060. The ZR36060 chip provides digital video compression in accordance with the JPEG standard, ISO/IEC 10918-1. For compression, the chip accepts YUV 4:2:2 format digital video, performs optional cropping and decimation, and encodes it into a JPEG baseline compressed bitstream, which can then be output to the multimedia controller 20. In decompression, the ZR36060 receives a compressed bitstream from the multimedia controller 20, decodes it back to YUV 4:2:2 format digital video, up-scales it if required, and outputs the uncompressed video.

The multimedia controller 20 provides an interface between the other video processing circuitry 15 (video decoder 14, video encoder 16, and compression/decompression circuit 18) and a PCI bus of a personal computer or workstation. As described hereinafter in greater detail, the multimedia controller 20 of the present embodiment communicates with the PCI bus of a personal computer or workstation through a PCI-to-PCI bridge interface 26 and connector 28. In the present embodiment, the multimedia controller 20 is implemented by an Enhanced PCI Bus Multimedia Controller chip available from ZORAN Corporation, Santa Clara, Calif. 95054, part no. ZR36057.

In addition to the video processing circuitry 15, the bus card 10 of the present invention further comprises a peripheral interface controller 21 for interfacing the bus card 10 to peripheral devices, including, in particular, digital mass storage devices such as removable cartridge disk drives. In the present embodiment, the peripheral interface controller 21 provides an interface between the PCI bus of a personal computer or workstation and a Small Computer Systems Interface (SCSI) bus. Two popular removable cartridge disk drives that may be connected to the bus card 10 through the peripheral interface controller 21 are the JAZ and ZIP drives manufactured and sold by Iomega Corporation, assignee of the present invention. The peripheral interface controller 21 of the bus card 10 comprises a PCI-to-SCSI controller 24 and a SCSI bus connector 22. In the present embodiment, the PCI-to-SCSI controller 24 is implemented by a PCI-to-Ultra SCSI Controller chip available from AdvanSys Corporation, part no. ASC3050. The ASC3050 is a single-chip, highly integrated Ultra SCSI controller, specifically designed for interfacing a PCI bus to a SCSI bus.

Further according to the present invention, in order to enable both the PCI-to-SCSI controller 24 and multimedia controller 20 to share communications over the PCI bus of a personal computer, a PCI bridge 26 is provided. A PCI bridge, like bridge 26, allows the PCI bus of a personal computer to be split and allows two PCI controllers to exist in the same PCI slot in the computer. Thus, in accordance with the present invention, both the PCI-to-SCSI controller 24 and the multimedia controller 20 communicate with the PCI bus of a personal computer through the PCI bridge 26. In the present embodiment, the PCI bridge comprises a NILE-II PT80C525, Advanced PCI-to-PCI Bridge Interface Controller chip available from National Semiconductor corporation. The NILE-II chip is a high-performance Microsoft® Windows® 95-compatible PCI-to-PCI bridge interface controller for portable and desktop systems. The NILE-II chip is fully compliant with the PCI Local Bus Specification Revision 2.1 and the PCI-to-PCI Bridge Specification Revision 1.0.

The bus card 10 of the present invention requires two software device drivers to operate. One driver controls the video processing circuitry 15 ("the video driver"), and the other controls the peripheral interface controller 24 ("the SCSI driver").

The video driver configures the bridge chip by setting up its internal registers for data transfers and communications. Acting through the bridge chip, the video driver then sets up the multimedia controller 20 to pass data coming from the decoder 14 or compression/decompression chip 18 (or both) to the PCI bus. The multimedia controller 20 can also pass data to the compression/decompression chip 18 to be decompressed and then pass that data back to the PCI bus through the bridge chip 26 to be displayed on the computer. The video driver also uses the multimedia controller 20 to set up various parameters needed by the compression chip 18, the video decoder 14, and the video encoder 16. For example, the video driver sets the compression/decompression chip 18 up for either compressing a video stream coming from the video decoder 14, or decompressing a video stream coming from the multimedia controller 20. The video driver configures the video decoder 14 and encoder 16 chips to establish and support various parameters, including, for example, video format (NTSC/PAL), chrominance, luminance, brightness, contrast, sync between encoder 16 and decoder 14, and gain.

The SCSI driver configures the PCI-to-SCSI controller 24, via the bridge chip 26, to establish and support, for example, the following parameters/signals/information: synchronous transfers, data transfer length, active negation and slew rate of SCSI pins, SCSI Device ID, SCSI Reset, etc.

In use, the bus card 10 of the present invention is installed in a personal computer or workstation PCI slot. Typically, some sort of video source device (television, camcorder, DVD, Laser Disc, VCR, VTR, etc.) and/or a video display device are connected to the video processing circuitry 15 via the video connectors 12. A mass storage device is connected to the bus card 10 via the connector 22 of the peripheral interface controller 24, which in the preferred embodiment, implements the SCSI bus standard. Video data may travel a number of paths through the bus card 10. For example, video data may be input from one video device, passed directly from the video decoder 14 to the video encoder 16, and then output to another video device. Video data may also pass from the video decoder 14 to the multimedia controller 20, and then either be transmitted through the peripheral interface controller 24 for storage on a mass storage device or transmitted directly to the PCI bus of the host personal computer (via the bridge 26 and connector 28). Alternatively, video data received by the video decoder 14 may be compressed by the compression/decompression circuit 18, and then transmitted through the multimedia controller 20 to either the peripheral interface controller 24 (for storage on a mass storage device) or the PCI bus of the host computer. Video data stored on a mass storage device can enter the bus card 10 through the peripheral interface controller 24, and can then be passed directly to the PCI bus of the host computer (via bridge 26 and connector 28), or the data can be passed through the bridge 26 to the multimedia controller 20 for either immediate output to a video device through the video encoder 16 or for decompression by the compression/decompression circuit 18. Video data generated or processed by the host computer, likewise can either be sent to the peripheral interface controller 24 for storage, or sent to the video processing circuitry 15.

As the foregoing illustrates, the present invention is directed to a bus card for personal computers and workstations that combines both video processing and peripheral interface control functions. By combining video processing capabilities and a peripheral interface in a single bus card, the present invention provides an efficient, economic, single-card solution for personal computers that will enable easy input, output, processing, capture and storage of digital video information. With the present invention, video data can be received from video devices, decoded, compressed, and stored to disk using only one bus card. Similarly, the bus card of the present invention can be used to retrieve video data from a storage disk, decompress it, encode it, and transmit it back to various video devices. Previously, this functionality required the use, installation, and integration of a number of separate bus cards typically supplied by different vendors. It is understood that changes may be made to the embodiment described above without departing from the broad inventive concepts thereof. For example, although the bus card of the preferred embodiment is designed to connect to a PCI bus of a personal computer or workstation, the bus card could be designed to connect to other personal computer bus architectures, so long as the bus has sufficient bandwidth to support video data rates. Additionally, other peripheral interface controllers can be implemented in place of the SCSI bus controller of the present embodiment, including, for example, IDE and EIDE controllers. Also, while JPEG compression is implemented in the present embodiment, other compression standards may be implemented, including, for example, MPEG compression. Moreover, while certain commercially available chips are described herein as implementing the various functional blocks of the bus card, it is understood that other equivalent chips from the same or different vendors may also be used. Accordingly, the present invention is not limited to the particular embodiment disclosed, but is intended to cover all modifications that are within the spirit and scope of the invention as defined by the appended claims.

What is claimed is:

1. A bus card for connecting to a local bus of a computer system, comprising:

a connector for connecting to the local bus;

a peripheral interface controller for enabling communication between a data storage device and the local bus;

video processing circuitry having connectors to enable input and output of video signals; and a bridge circuit coupled to said connectors said peripheral interface controller in electrical communication with said connector by way of said bride circuit and said video processing circuitry in electrical communication with said connector by way of said bridge circuit said electrical communication of said video processing circuitry and peripheral interface controller with said connector by way of said bridge circuit enabling a data storage device via the peripheral interface controller and the video processing circuitry to share a single connection to the local bus of the computer system by way of the connector.

2. The bus card recited in claim 1, wherein the video processing circuitry comprises a video encoder, a video decoder and a compression/decompression circuit.

3. The bus card recited in claim 1, wherein the local bus of the computer system comprises a PCI bus, and wherein the peripheral interface controller comprises a PCI-to-SCSI controller.

4. The bus card recited in claim 1, wherein the local bus of the computer system comprises a PCI bus, and wherein the bridge circuit comprises a PCI-to-PCI bridge.

5. The bus card as recited in claim 1 wherein said data storage device comprises a disk drive.

6. The bus card as recited in claim 5 wherein said data storage device comprises a removable medium data storage device.

* * * * *